United States Patent
Kawakami et al.

(10) Patent No.: US 9,478,058 B2
(45) Date of Patent: Oct. 25, 2016

(54) OBJECT CORRECTING APPARATUS AND METHOD AND COMPUTER-READABLE RECORDING MEDIUM

(75) Inventors: Yosuke Kawakami, Tokyo (JP); Shin Oohara, Tokyo (JP); Daisuke Higuchi, Tokyo (JP)

(73) Assignee: CELSYS, Inc., Tokyo (JP)

( * ) Notice: Subject to any disclaimer, the term of this patent is extended or adjusted under 35 U.S.C. 154(b) by 365 days.

(21) Appl. No.: 13/567,177

(22) Filed: Aug. 6, 2012

(65) Prior Publication Data
US 2014/0039861 A1 Feb. 6, 2014

(51) Int. Cl.
*G06F 3/048* (2013.01)
*G06T 13/40* (2011.01)
*G06T 19/20* (2011.01)

(52) U.S. Cl.
CPC ............ *G06T 13/40* (2013.01); *G06T 19/20* (2013.01); *G06T 2219/2021* (2013.01)

(58) Field of Classification Search
None
See application file for complete search history.

(56) References Cited

U.S. PATENT DOCUMENTS

| | | | | |
|---|---|---|---|---|
| 5,586,224 A | * | 12/1996 | Kunii et al. | 700/260 |
| 5,692,117 A | * | 11/1997 | Berend | G06T 13/80 345/475 |
| 5,933,150 A | * | 8/1999 | Ngo et al. | 345/473 |
| 6,333,749 B1 | * | 12/2001 | Reinhardt et al. | 345/629 |
| 6,577,315 B1 | * | 6/2003 | Kroitor | 345/473 |
| 6,792,398 B1 | * | 9/2004 | Handley et al. | 703/2 |
| 7,123,269 B1 | * | 10/2006 | Bourdey et al. | 345/589 |
| 2004/0012640 A1 | * | 1/2004 | Gauthier | 345/848 |
| 2004/0174361 A1 | * | 9/2004 | Yomdin | G06T 9/20 345/441 |
| 2006/0274068 A1 | * | 12/2006 | Barthelet | 345/473 |
| 2008/0036776 A1 | * | 2/2008 | Niles et al. | 345/474 |
| 2008/0204457 A1 | * | 8/2008 | Anderson | 345/473 |
| 2008/0221487 A1 | * | 9/2008 | Zohar et al. | 600/595 |
| 2008/0222555 A1 | * | 9/2008 | Coyne | 715/781 |
| 2012/0021828 A1 | * | 1/2012 | Raitt | A63F 13/63 463/31 |

OTHER PUBLICATIONS

Hamer, Henning, et al. "Data-driven animation of hand-object interactions." Automatic Face & Gesture Recognition and Workshops (FG 2011), 2011 IEEE International Conference on. IEEE, Mar. 2011.*
Albrecht, Irene, Jörg Haber, and Hans-Peter Seidel. "Construction and animation of anatomically based human hand models." Proceedings of the 2003 ACM SIGGRAPH/Eurographics symposium on Computer animation. Eurographics Association, 2003.*

* cited by examiner

*Primary Examiner* — Sultana M Zalalee
(74) *Attorney, Agent, or Firm* — IPUSA, PLLC

(57) ABSTRACT

An object correcting method includes disposing multiple sample objects at different positions on a display screen, the sample objects having respective attributes characteristic thereof; obtaining the position of a point on the display screen specified by a user; changing the attribute of a target object by calculating an interpolated value of the attributes of the sample objects based on the positions at which the sample objects are disposed and the position of the point and replacing the value of at least one of the parameters of the attribute of the target object with the calculated interpolated value; and correcting the target object based on the changed attribute thereof.

15 Claims, 14 Drawing Sheets

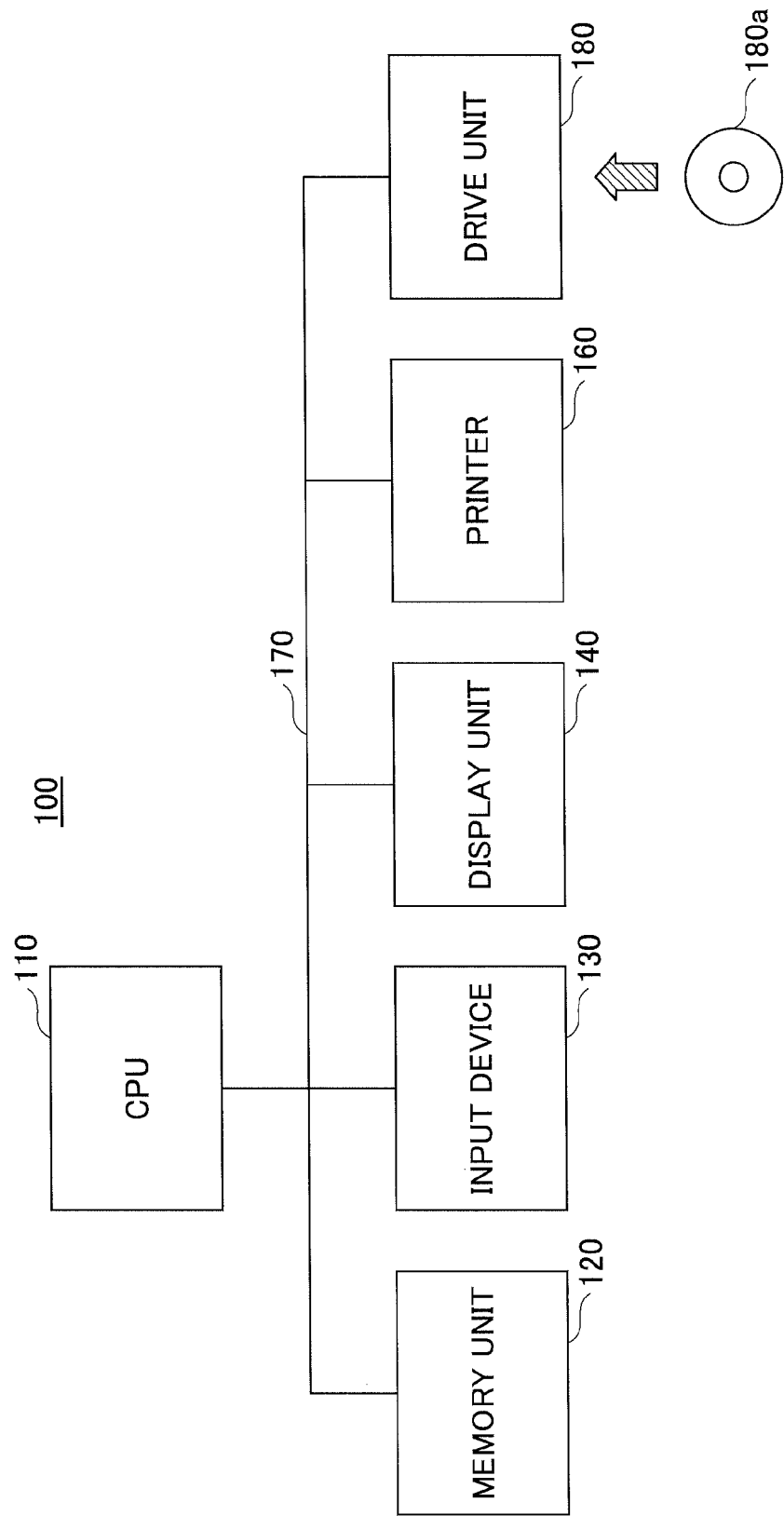

SECOND BONE (CHILD BONE)
JOINT
FIRST BONE (PARENT BONE)

PARENT BONE
JOINT
CHILD BONE

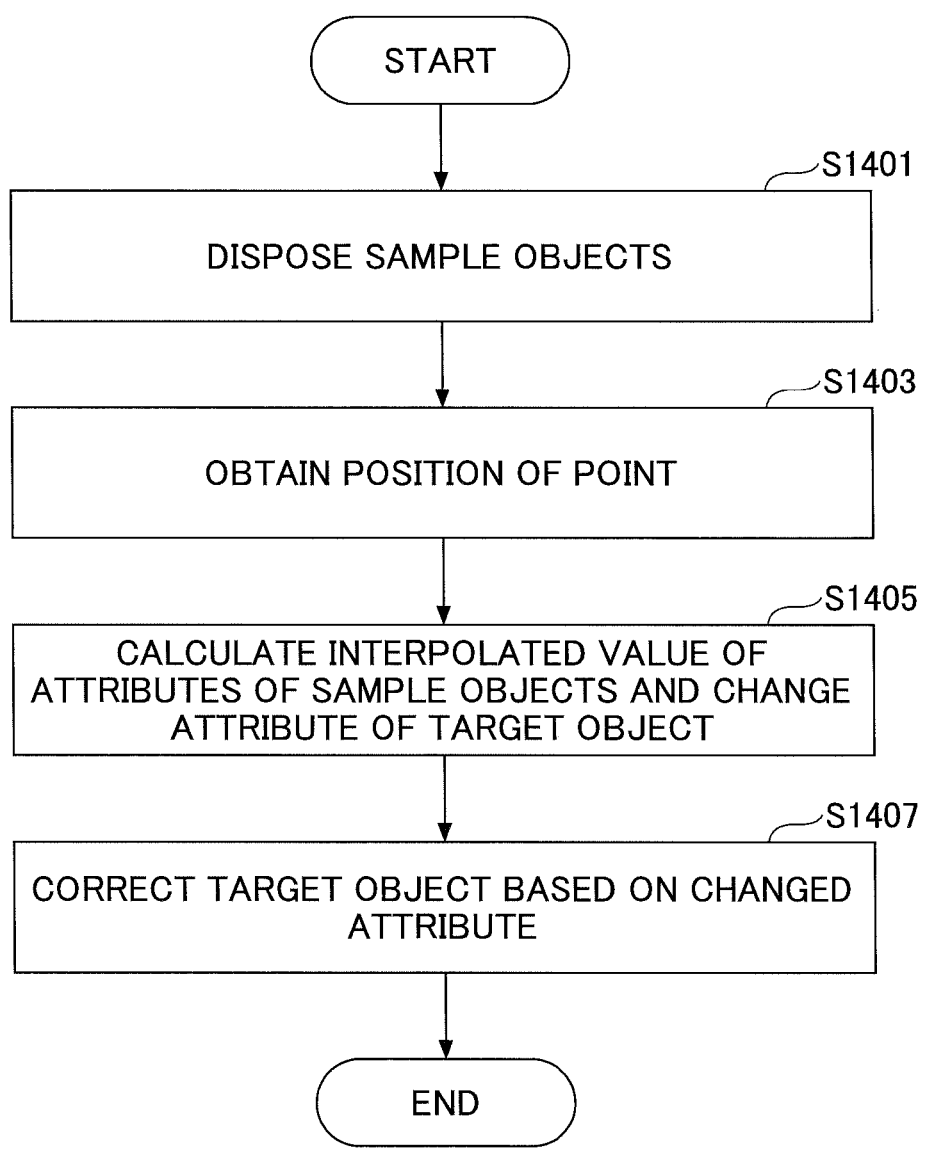

OBJECT CORRECTING APPARATUS AND METHOD AND COMPUTER-READABLE RECORDING MEDIUM

CROSS-REFERENCE TO RELATED APPLICATION

This application is based upon the prior Japanese Patent Application No. 2011-024448, filed on Feb. 7, 2011, the entire contents of which are incorporated herein by reference.

BACKGROUND OF THE INVENTION

1. Field of the Invention

The present invention relates to an object correcting apparatus and method and a computer-readable recording medium with an executable program recorded thereon, the program causing a processor to execute the object correcting method.

2. Description of the Related Art

In the field of computer graphics, there are various techniques that use a three-dimensional model (object) in a virtual space, for example, a skeleton model, and cause an intended pose (posture, shape, etc.) of the three-dimensional model to be displayed on a display. Further, there are various techniques for causing a robot to have a desired posture or to move in a real space.

Examples of interfaces that an operator uses to cause an object in a virtual space or a real space to make an intended posture include a mouse and a two-dimensional tablet. Further, there is also a technique that obtains desired input values by measuring the positions of parts of a human body by capturing markers provided on the human body with a camera. In addition, an input device formed of a glove-type manipulator is also used. Further, a technique is also known that directly measures human movements in a contactless manner using light, ultrasonic waves or the like, and uses the measured values.

SUMMARY OF THE INVENTION

According to an aspect of the present invention, an object correcting method includes disposing a plurality of sample objects at different positions on a display screen, the sample objects having respective attributes characteristic thereof; obtaining a position of a point on the display screen specified by a user; changing an attribute of a target object by calculating an interpolated value of the attributes of the sample objects based on the positions at which the sample objects are disposed and the position of the point and replacing a value of at least one of parameters of the attribute of the target object with the calculated interpolated value; and correcting the target object based on the changed attribute thereof.

According to an aspect of the present invention, a non-transitory computer-readable recording medium has an executable program recorded thereon, the program causing a processor to execute the object correcting method as set forth above.

According to an aspect of the present invention, an object correcting apparatus includes a sample object disposing part configured to dispose a plurality of sample objects at different positions on a display screen, the sample objects having respective attributes characteristic thereof; a point position obtaining part configured to obtain a position of a point on the display screen specified by a user; an attribute changing part configured to change an attribute of a target object by calculating an interpolated value of the attributes of the sample objects based on the positions at which the sample objects are disposed and the position of the point and replacing a value of at least one of parameters of the attribute of the target object with the calculated interpolated value; and a target object correcting part configured to correct the target object based on the changed attribute thereof.

The object and advantages of the embodiments will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which:

FIG. 1 is a diagram illustrating a hardware configuration of an apparatus according to an embodiment of the present invention;

FIG. 14 is a flowchart illustrating a flow of an object correcting method according to an embodiment of the present invention.

DETAILED DESCRIPTION OF THE PREFERRED EMBODIMENTS

Figure 2A:
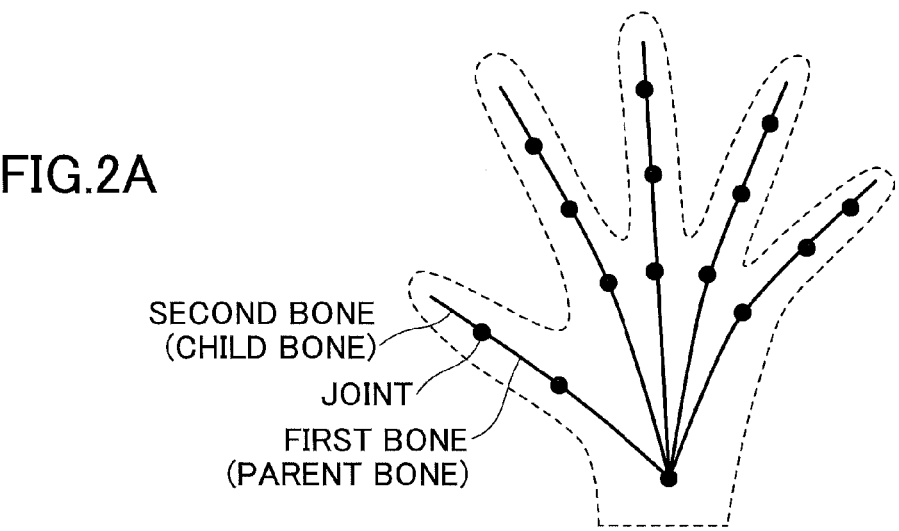
FIGS. 2A and 2B are diagrams illustrating a skeleton model used in an embodiment of the present invention.

Of the above-described conventional input interfaces, pointing devices such as a mouse and a two-dimensional tablet are inexpensive compared with the above-described other input devices, and have become popular. However, for example, in order to cause a model in a three-dimensional space to make a desired pose as intended by an operator, it is necessary to set or change various parameters, which requires complicated operations. Further, there is a problem in that it is difficult for an operator to intuitively understand the relationship between changes in the values of various parameters and changes in the pose.

In contrast, measuring movements of a human body by providing the human body with markers or measuring movements of a hand using a glove-type manipulator makes it possible for an operator to intuitively understand a process to some extent. Unfortunately, however, the devices are complicated and are not popular. Further, there is the disadvantage that users who are not accustomed to operations have difficulty in handling the devices. In addition, these input devices are expensive.

According to an aspect of the present invention, an object correcting apparatus and method are provided that are capable of changing the shape, position, and other attributes of an object in a manner easy for a user to intuitively understand, using a relatively simple input device such as a mouse or a tablet.

According to an aspect of the present invention, a computer-readable recording medium with an executable program recorded thereon is provided, the program causing a processor to execute the object correcting method.

According to an aspect of the present invention, it is possible to change the attribute of an object with a simple operation easy for a user to intuitively understand. For example, it is possible to cause a three-dimensional model to make a desired pose with a simple operation.

In the following description, a three-dimensional model in a virtual space displayable on a display, particularly a skeleton model, is taken as an object to be manipulated. However, embodiments of the present invention are applied not only to the skeleton model but also to a model in a two-dimensional space. In addition, embodiments of the present invention may also be applied to an object in a real space. Accordingly, the technical scope of the claims of the present application may cover application to an object in a virtual space and a real space.

In the following description, it is assumed that a target model has multiple parameters, and a set of specific values of the parameters is defined as the attribute of the model.

A description is given below, with reference to the accompanying drawings, of embodiments of the present invention.

FIG. 1 is a block diagram illustrating a hardware configuration of an apparatus 100 according to an embodiment of the present invention.

The apparatus 100 may include a central processing unit (CPU) 110, a memory unit 120, an input device 130, a display unit 140, a printer 160, and a drive unit 180, which are interconnected by a bus 170. The memory unit 120 includes a static memory and a dynamic memory. For example, the memory unit 120 may include a read-only memory (ROM), a random access memory (RAM), and a hard disk drive (HDD). The memory unit 120 contains information such as images, loci, and programs. The input device 130 is for moving a pointer, inputting text, inputting commands, and so on. For example, the input device 130 includes a mouse, a tablet, a touchscreen, and/or a keyboard. The display unit 140 allows images, user interfaces, etc., to be displayed. The tablet and the touchscreen may operate in combination with the display unit 140. The printer 160 prints out images, etc.

A recording medium 180a, on which a program for causing a computer to execute an object correcting method according to an embodiment of the present invention is recorded, may be loaded into the drive unit 180. The drive unit 180 reads the program from the recording medium 180a. The read program is loaded into, for example, the RAM of the memory unit 120 and executed by the CPU 110 so that below-described functions of the apparatus 100 are implemented. Examples of the recording medium 180a include magnetic recording media, optical disks, magneto-optical recording media, semiconductor memories, and memory cards. Example of magnetic recording media includes flexible disks and magnetic tapes. Examples of optical disks include digital versatile disk (DVD)s, DVD-random access memory (DVD-ROMs, compact disk read-only memory (CD-ROM)s, CD-recordable (CD-R)s, and CD-rewritable (CD-RW)s. Examples of magneto-optical recording media include magneto-optical disk (MO)s. Examples of semiconductor memories include electronically erasable and programmable read-only memory (EEPROM)s (including flash memories).

A suitable device that allows the loading (reading) of the program from the recording medium 180a may be used as the drive unit 180 depending on the type of the recording medium 180a. For example, the drive unit 180 may be implemented as a medium reader by a USE port for USE memories and by a card slot for an SD card.

Alternatively, the program for causing a computer to execute an object correcting method according to an embodiment of the present invention may be recorded in, for example, the HDD of the memory unit 120 as a recording medium, and be executed by the CPU 110.

The above-described configuration of the apparatus 100 is an example, and may incorporate other units or devices. Further, the apparatus 100 may include a controller (not graphically illustrated) that controls a robot in a real space.

FIG. 2A is a diagram illustrating a skeleton model of a hand used for describing an embodiment of the present invention. In setting a pose or creating an animation by moving a computer graphics (CG) character, a skeleton model connecting multiple bones by a joint (FIG. 2A) may be used. Such a skeleton model may be used in the case of controlling an object not only in a virtual space but also in a real space in robot control or the like.

Figure 2B:
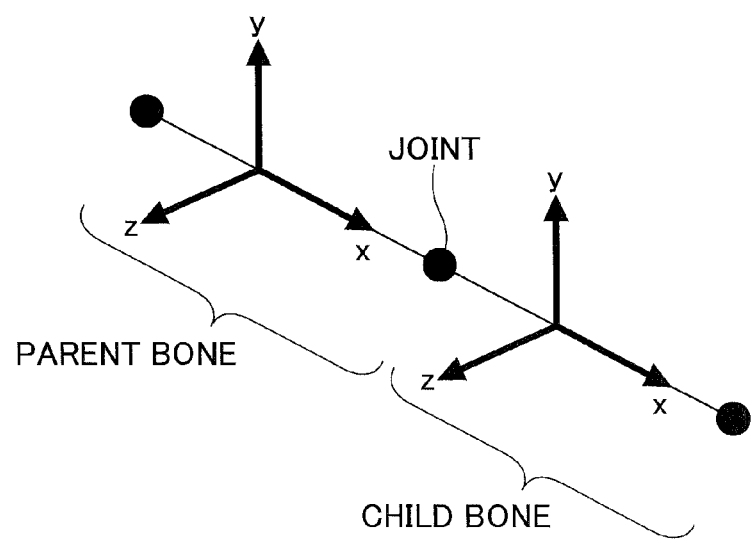

As illustrated in FIG. 2B, of the bones with one on each side of a joint, one is referred to as a "parent bone" and the other is referred to as a "child bone." For example, the rotation (bending or torsion) of each bone relative to the joint as a center is determined as a multi-dimensional parameter. The rotation (amount of rotation) of a bone connected to a joint may be an angle formed by the bone and another bone connected to the joint. By setting the value of this multi-dimensional parameter, the attribute of the skeleton model is determined, and a particular pose based on this attribute is determined. For example, a coordinate system may be determined for each bone as illustrated in FIG. 2B in order to represent the orientation of the bone.

As the parameter that determines the attribute of the skeleton model, any object may be determined as a parameter in addition to the above-described amount of rotation, and its value may be changed. For example, the length or thickness of a particular bone may be determined as a parameter. Further, for example, texture applied to skin covering the skeleton model may be determined as a parameter.

Figure 3:
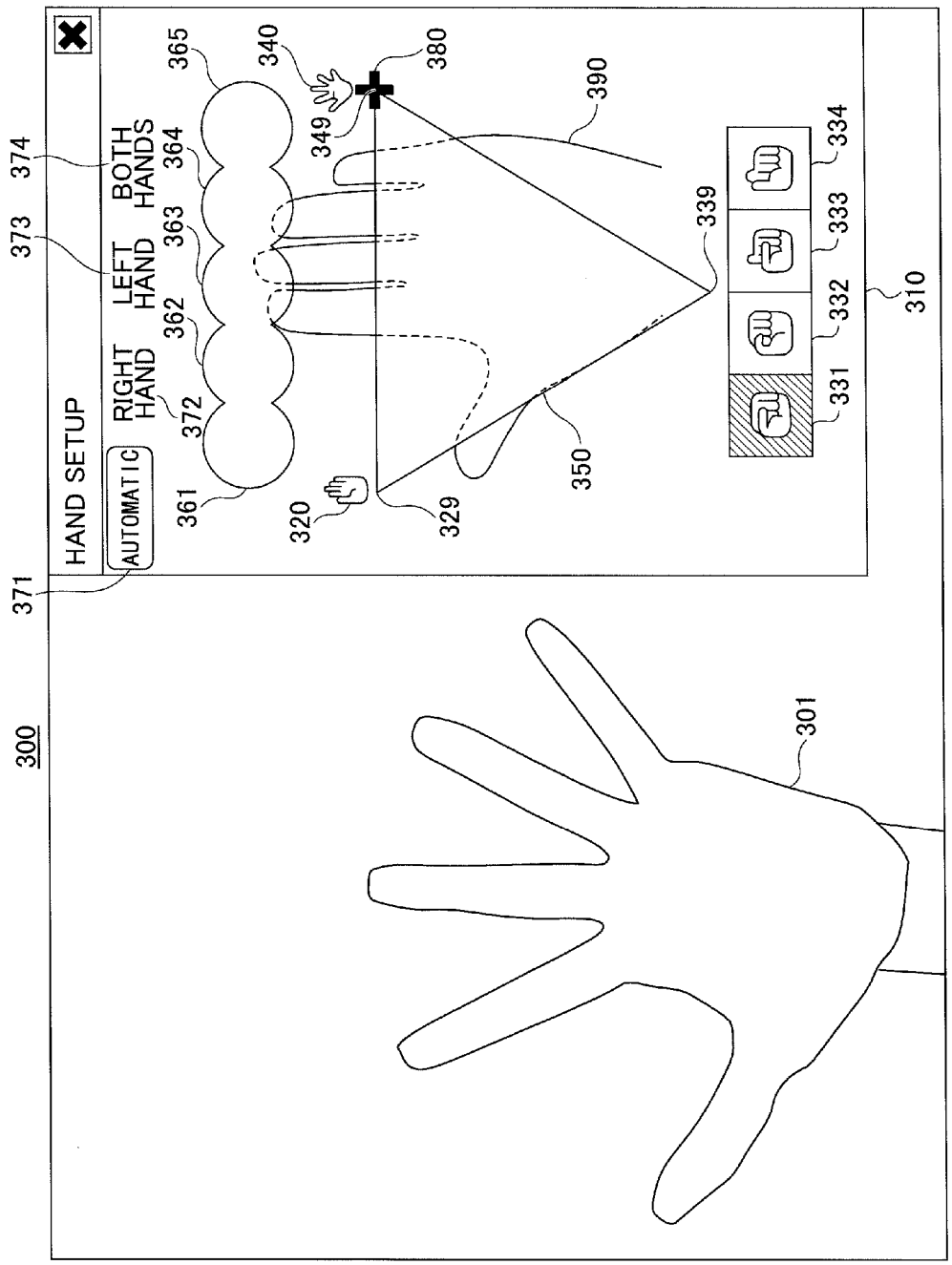
FIG. 3 is a diagram illustrating an embodiment of the present invention.

FIG. 3 is a diagram illustrating an embodiment of the present invention, where the skeleton model of the hand illustrated in FIG. 2A is used. FIG. 3 illustrates a display screen 300 as a user interface on, for example, the display unit 140 (FIG. 1). A target object 301, whose skeleton model is to be changed, is displayed on the display screen 300.

An operator (user) may cause the target object 301 to have a desired pose by manipulating multiple commands displayed in a hand setup window 310 with a pointing device such as a mouse.

There is a triangle 350 in the hand setup window 310. A pointer 380, whose desired position may be specified with the pointing device by the operator, is shown in the triangle 350. A sample object 320 having a shape of an open hand with fingers extended and touching, sample objects 331, 332, 333, and 334 having respective shapes of a clenched fist, and a sample object 340 having a shape of an open hand with fingers extended and untouched are disposed at the corresponding vertex positions of the triangle 350. With respect to the clenched fist shape, a desired one of the poses of the sample objects 331 through 334 may be selected by the operator. In the case of this embodiment, it is shown that the clenched fist shape of the sample object 331 is selected. Multiple options may be displayed with respect to the other sample objects 320 and 340 as well. Further, a user-created object may be adopted as a sample object.

Hold areas 361, 362, 363, 364, and 365 correspond to a thumb, an index finger, a middle finger, a ring finger, and a little finger, respectively, of the target object 301. The operator sees this correspondence through a hand illustration 390. In response to the operator clicking on one of the hold areas 361 through 365, the control of a finger corresponding to the click is disabled so that the pose of the corresponding finger may be fixed. A description is given below of this setting.

Buttons 371, 372, 373, and 374 allow the operator to select one or both of the right hand and the left hand as a target of control. In the case of selecting "AUTOMATIC" (the button 371), one or both of the right hand and the left hand may be automatically determined as a target of control in accordance with a predetermined rule. Alternatively, one or both of the right hand and the left hand may be determined as a target of control in accordance with a default setting value.

In FIG. 3, the pointer 380 is positioned at the position of the sample object 340 of an open hand with fingers extended and untouched. Therefore, the target object 301 has the shape of an open hand with fingers extended and untouched.

Figure 4:
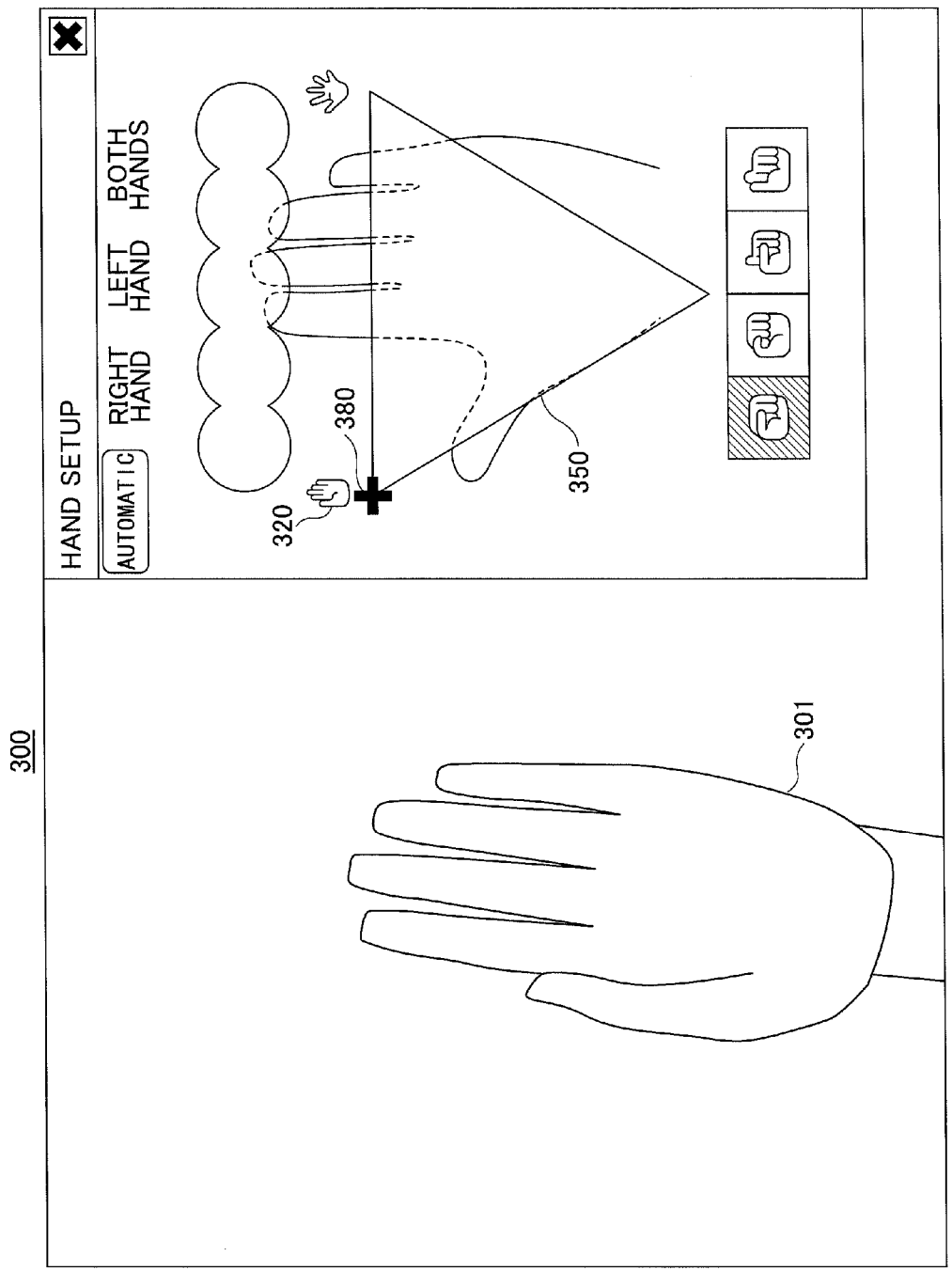
FIG. 4 is another diagram illustrating the embodiment of the present invention.

FIG. 4 is a diagram illustrating a case where the pointer 380 is at the position of the sample object 320 of an open hand with fingers extended and touching. In this case, the target object 301 conforms in shape to the sample object 320 having the shape of an open hand with fingers extended and untouched.

Figure 5:
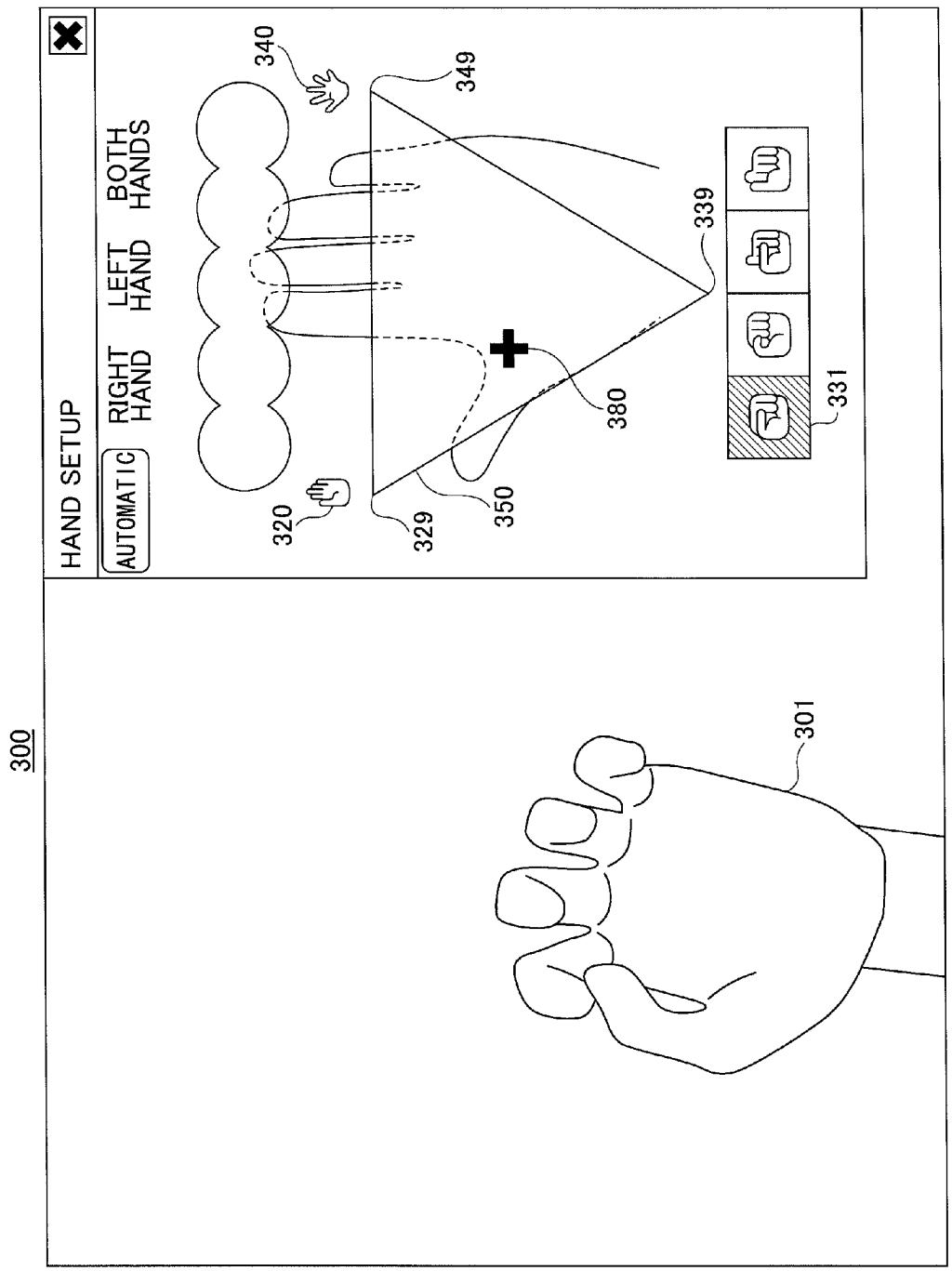
FIG. 5 is another diagram illustrating the embodiment of the present invention.

FIG. 5 is a diagram illustrating a case where the pointer 380 is positioned slightly to the left of the center of the triangle 350. In this case, an interpolated attribute is calculated that has an interpolated value obtained by performing interpolation on the attributes of the sample objects 320, 331, and 340 based on the coordinates of the position of the pointer 380 and the coordinates of vertices 329, 339, and 349 of the triangle 350, and a pose of the target object 301 corresponding to this interpolated attribute is generated and displayed on the display screen 300. A description is given below of calculation of the interpolated attribute.

Thus, the position of the pointer 380 is determined by the operator pointing a position inside or on a side of the triangle 350, and it is possible to correct the pose of the target object 301 as intended by the operator by calculating an interpolated attribute corresponding to this position of the pointer 380.

Figure 6:
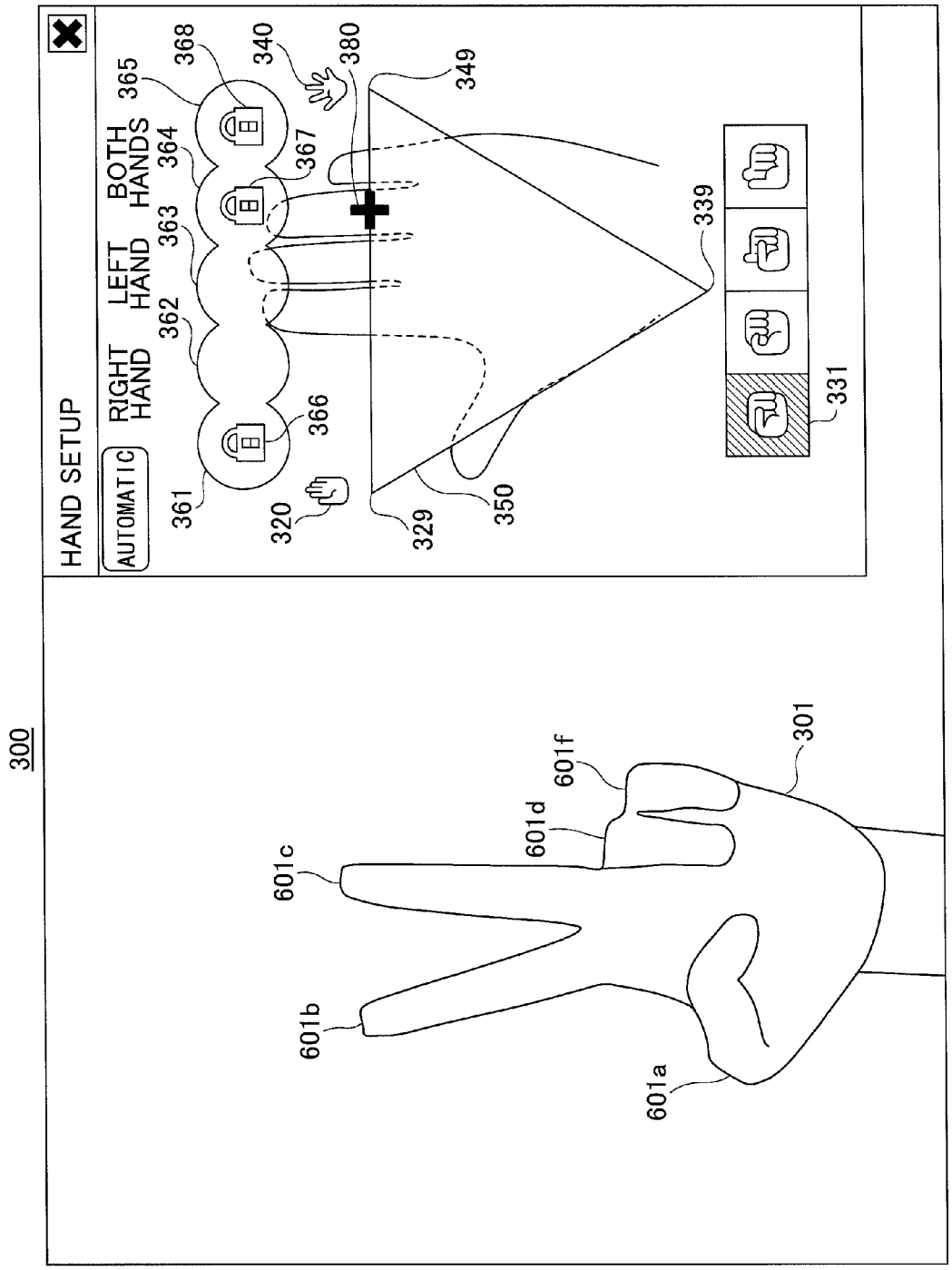
FIG. 6 is another diagram illustrating the embodiment of the present invention.

FIG. 6 is a diagram illustrating the case of partly correcting attributes. In this case, it is assumed that the pointer 380 is initially positioned at the vertex 339 (the position of a clenched fist). In this case, it is clear from the above-described case that the target object 301 has the shape of a clenched fist. It is assumed that in this state, the operator clicks on the hold areas 361, 364, and 365 to cause key marks 366, 367, and 368 to be displayed. In response to these key marks 366, 367, and 368 being displayed, the attributes of a corresponding thumb 601a, ring finger 601d, and little finger 601f are fixed. Since no key marks are set in the hold areas 362 and 363, the attributes of an index finger 601b and a middle finger 601c are selected as objects of correction. Thereafter, in response to the operator moving the pointer 380 to the position illustrated in FIG. 6, the attributes of the index finger 601b and the middle finger 601c of the target object 301 are replaced with calculated interpolated attributes. As a result, the pose of the target object 301 is corrected to a closed fist with two fingers outstretched and is displayed.

In FIG. 6, a finger whose attribute is to be fixed is set with a key mark, but a finger whose attribute is to be corrected may be specified with a mouse. Further, with respect to a finger for which a key mark is shown, while the attribute is fixed in the above-described case, the calculation method of interpolation may also be changed to any calculation method. Further, instead of fixing the attribute, the attribute may be set to a default value.

In the above-described embodiment, the case of correcting the pose of a hand object is illustrated as an example, but the object may be other than a hand. Further, while the displayed target object 301 is an object in a virtual space, an object in a real space may also be controlled based on a calculated interpolated object. A description is omitted herein of a method of controlling an object in a real space, for which various methods known to a person of ordinary skill in the art are employable.

Figure 7:
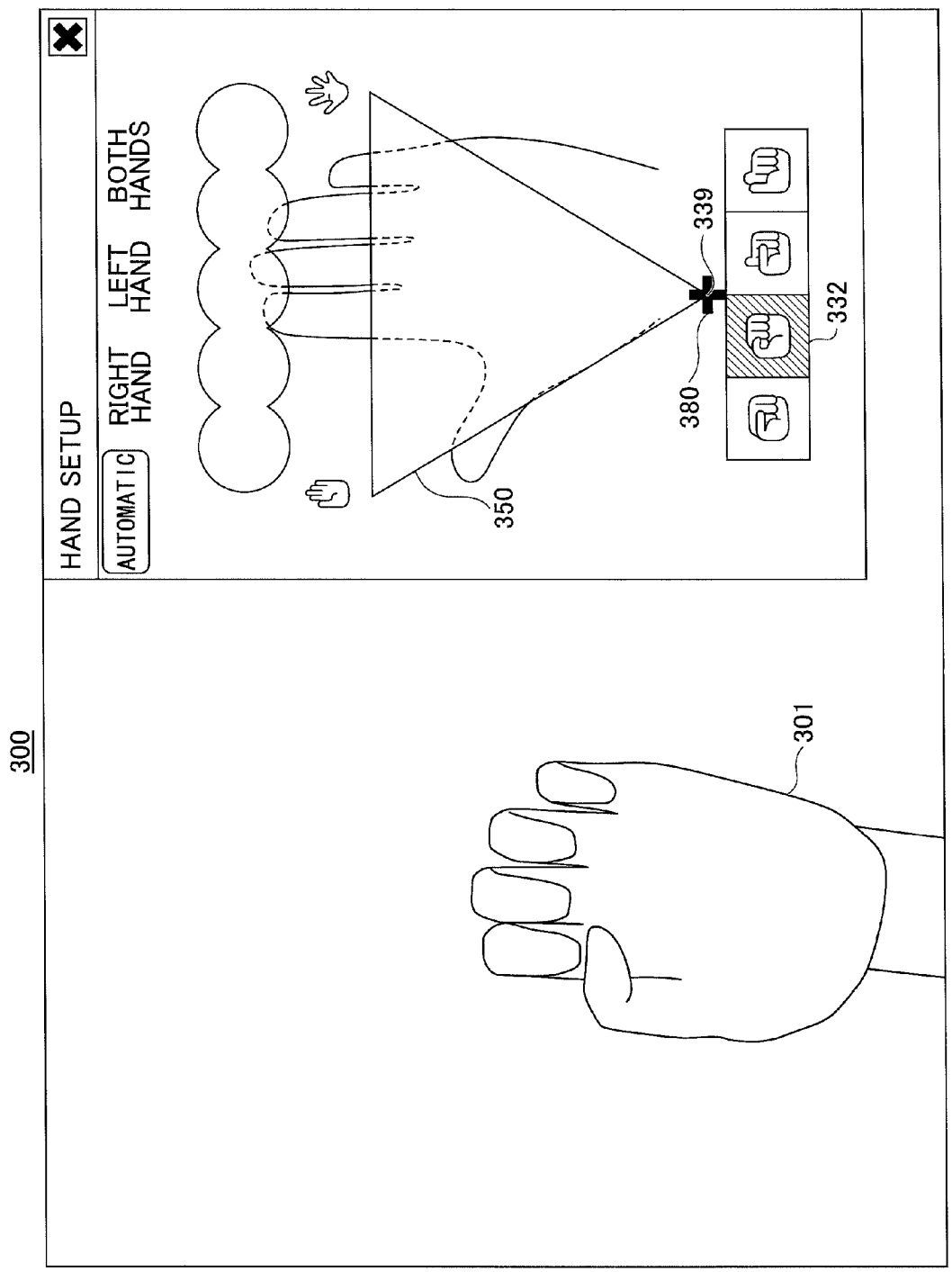
FIG. 7 is another diagram illustrating the embodiment of the present invention.
Figure 8:
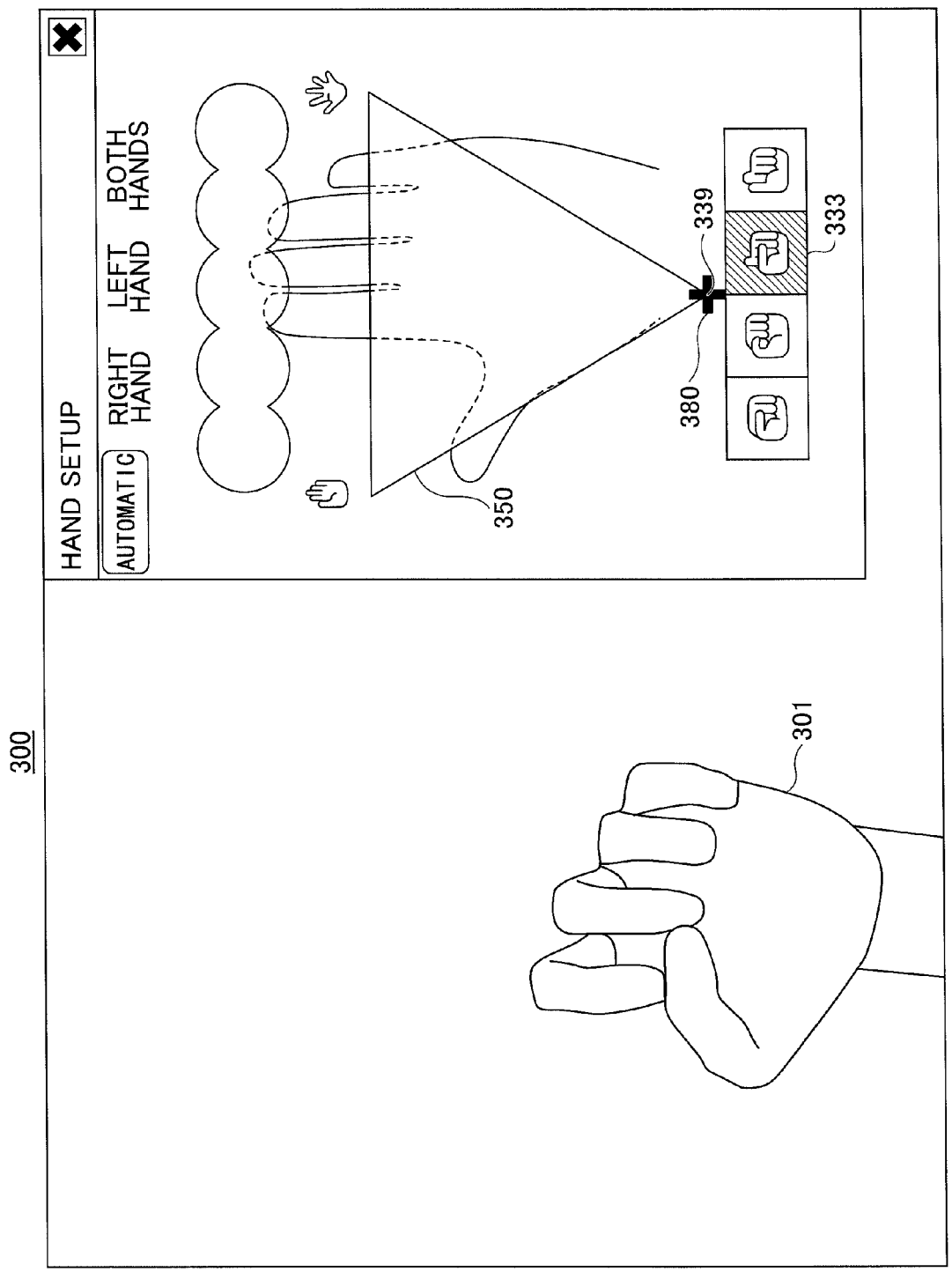
FIG. 8 is another diagram illustrating the embodiment of the present invention.
Figure 9:
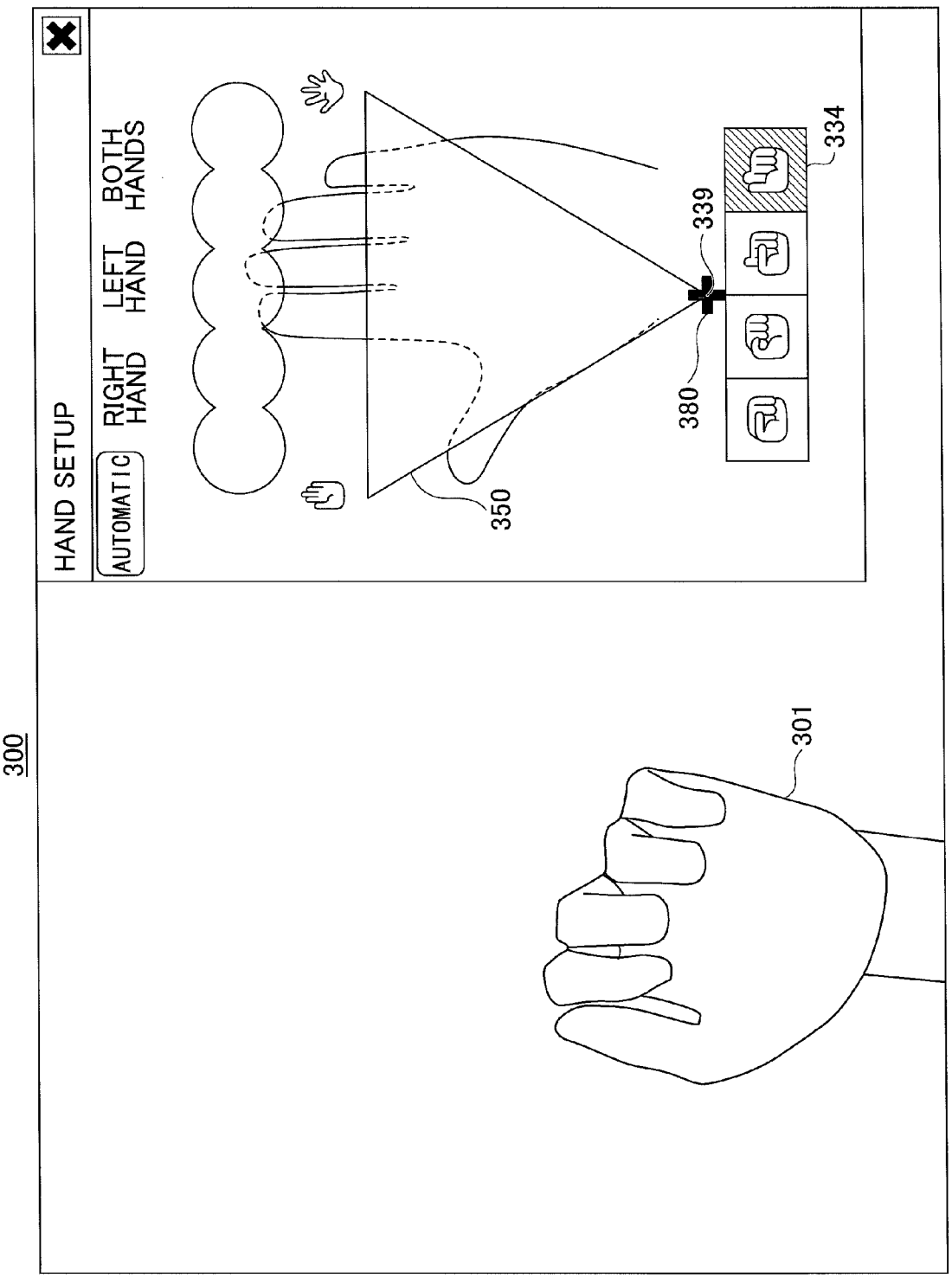
FIG. 9 is another diagram illustrating the embodiment of the present invention.

FIG. 7, FIG. 8, and FIG. 9 are diagrams illustrating the shape of the target object 301 in the case of selecting the sample object 332, 333, and 334, respectively, when the pointer 380 is positioned at the vertex 339 of the triangle 350.

[Example of Interpolation Calculation]

A description is given in detail below of linear interpolation using a triangle. The interpolation according to embodiments of the present invention is not limited to linear interpolation. Further, the figure used in the interpolation according to embodiments of the present invention is not limited to a triangle, and may be a polygon other than a triangle, such as a convex polygon. Further, the figure used in the interpolation according to embodiments of the present invention is not limited to a plane figure such as a triangle. Accordingly, the interpolation according to embodiments of the present invention may be developed into interpolation using a polyhedron such as a convex polyhedron in a three-dimensional space. A description is given below of a user interface using a polyhedron.

Figure 10:
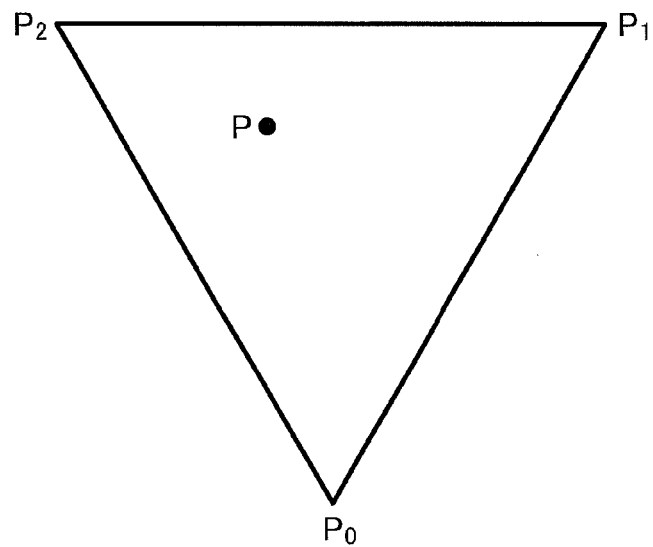
FIG. 10 is a diagram for illustrating interpolation of an attribute using a triangle according to an embodiment of the present invention.

FIG. 10 is a diagram illustrating a triangle with vertices $P_0$, $P_1$, and $P_2$ in which Point P is present. A description is given of the case where in response to the specifying of Point P in the triangle $P_0P_1P_2$, linear interpolation is performed on the attributes of the vertices $P_0$, $P_1$, and $P_2$ in accordance with the position of Point P.

It is assumed that the vertices $P_0$, $P_1$, and $P_2$ have respective attributes $a_0$, $a_1$, and $a_2$. An attribute a of Point P is obtained by performing linear interpolation on the three values $a_0$, $a_1$, and $a_2$ as follows.

Figure 11:
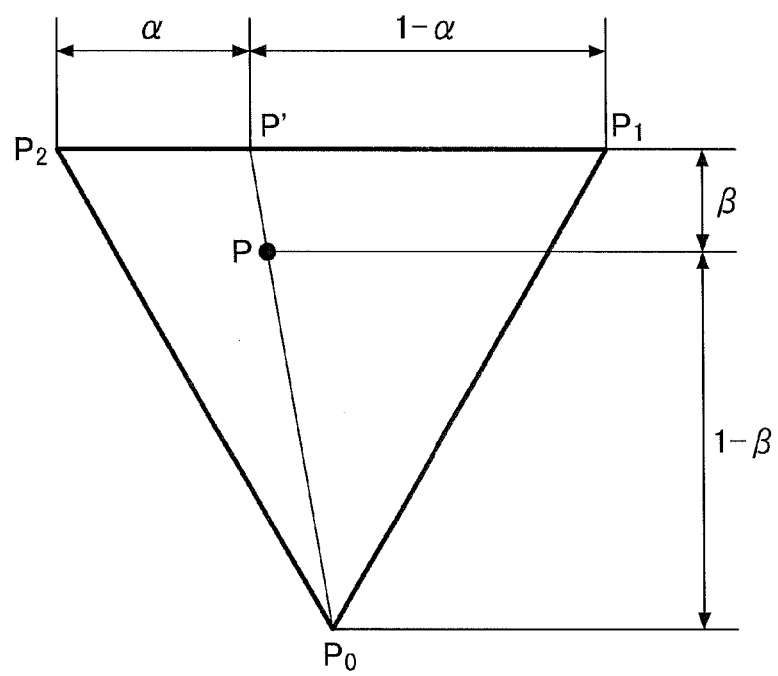
FIG. 11 is a diagram for illustrating the interpolation of an attribute using a triangle according to the embodiment of the present invention.

A line segment $P_0P$ is extended to intersect a side $P_1P_2$ at an intersection point P' as illustrated in FIG. 11. It is assumed that as illustrated in FIG. 11:

$$P_2P':P'P_1 = \alpha:(1-\alpha), \quad (1)$$

$$P'P:PP_0 = \beta:(1-\beta). \quad (2)$$

Then, performing linear interpolation between $P_2$ and $P_1$, an attribute a' of Point P' is given by the following equation:

$$a' = \alpha a_1 + (1-\alpha)a_2. \quad (3)$$

Performing linear interpolation between P' and $P_0$, the attribute a of Point P is given by the following equations:

$$a = \beta a_0 + (1-\beta)a', \quad (4)$$
$$= \beta a_0 + \alpha(1-\beta)a_1 + (1-\alpha)(1-\beta)a_2. \quad (5)$$

Figure 12:
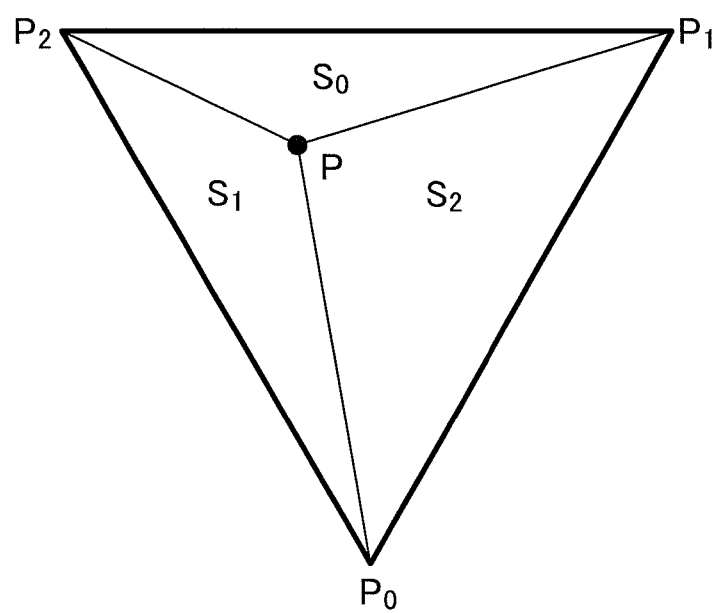
FIG. 12 is a diagram for illustrating the interpolation of an attribute using a triangle according to the embodiment of the present invention.

Further, focusing attention on the area of triangles, the attribute a of Point P may also be determined as follows. It is assumed that $\Delta P_0 P_1 P_2$ has an area S and $\Delta P P_1 P_2$, $\Delta P P_2 P_0$, and $\Delta P P_0 P_1$ have areas $S_0$, $S_1$, and $S_2$, respectively, as illustrated in FIG. 12. Focusing attention on the ratios of the areas of the triangles, the following equations result:

$$\Delta P_0 P' P_2 : \Delta P_0 P' P_1 = \alpha:(1-\alpha), \quad (6)$$

$$\Delta P_0 P' P_2 : \Delta P P' P_2 = \Delta P_0 P' P_1 : \Delta P P' P_1 = 1:\beta. \quad (7)$$

Accordingly, the following ratios of areas are obtained:

$$S_0/S = \beta,$$
$$S_1/S = \alpha(1-\beta),$$
$$S_2/S = (1-\alpha)(1-\beta). \quad (8)$$

Using these, the attribute a of Point P is expressed by the following equation:

$$a = a_0 S_0/S + a_1 S_1/S + a_2 S_2/S. \quad (9)$$

Letting the position coordinates of Points $P_0$, $P_1$, $P_2$, and P be $v_0$, $v_1$, $v_2$ and $v$, respectively, $C_{01}$, $C_{12}$, $C_{20}$, $C_0$, $C_1$, and $C_2$ are determined as follows:

$$C_{01} \equiv v_0 \times v_1, \quad (10)$$

$$C_{12} \equiv v_1 \times v_2, \quad (11)$$

$$C_{20} \equiv v_2 \times v_0, \quad (12)$$

$$C_0 \equiv v \times v_0, \quad (13)$$

$$C_1 \equiv v \times v_1, \quad (14)$$

$$C_2 \equiv v \times v_2. \quad (15)$$

Then, the areas of the triangles are expressed as follows:

$$S = (v_0 \times v_1 + v_1 \times v_2 + v_2 \times v_0)/2 = (C_{01} + C_{12} + C_{20})/2, \quad (16)$$

$$S_0 = (v \times v_1 + v_1 \times v_2 - v_2 \times v)/2 = (C_1 - C_2 + C_{12})/2, \quad (17)$$

$$S_1 = (v \times v_2 + v_2 \times v_0 - v_0 \times v)/2 = (C_2 - C_0 + C_{20})/2, \quad (18)$$

$$S_2 = (v \times v_0 + v_0 \times v_1 - v_1 \times v)/2 = (C_0 - C_1 + C_{01})/2. \quad (19)$$

Using these, the value a of linear interpolation is expressed by the following equation:

$$a = (a_0(C_1 - C_2 + C_{12}) + a_1(C_2 - C_0 + C_{20}) + a_2(C_0 - C_1 + C_{01}))/(C_{01} + C_{12} + C_{20}). \quad (20)$$

The illustrated case is based on interpolation. However, embodiments of the present invention are not limited to interpolation, and may use extrapolation in place of interpolation. In the case of using extrapolation, the skeleton model may have an unnatural shape. In this case, the range of movement of the skeleton model may be restricted. With respect to the restriction of the range of movement of the skeleton model, various methods have been proposed and are known to a person of ordinary skill in the art, and accordingly, a description thereof is omitted herein.

[User Interface Using Triangular Pyramid]

By developing an embodiment where interpolation is performed on the attributes of three sample objects using a triangle, interpolation may be performed on the attributes of four sample objects using, for example, a triangular pyramid.

Figure 13A:
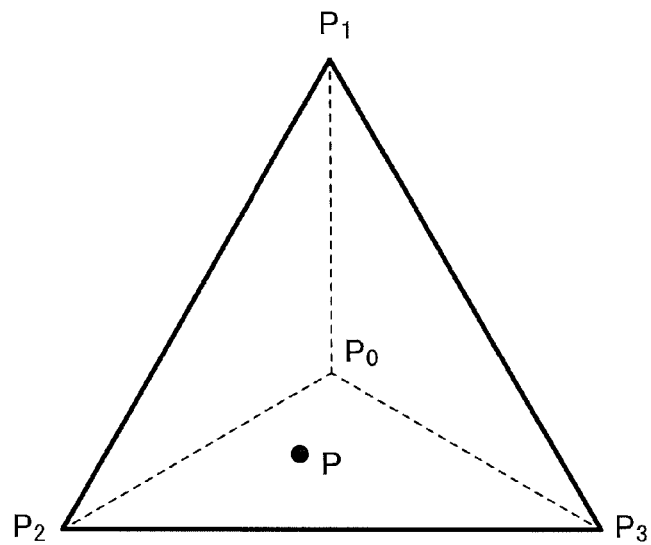
FIGS. 13A and 13B are diagrams illustrating interpolation of an attribute and a user interface using a triangular pyramid according to an embodiment of the present invention.

FIG. 13A is a diagram illustrating a user interface using a triangular pyramid. It is assumed that vertices $P_0$, $P_1$, $P_2$, and $P_3$ have respective attributes $a_0$, $a_1$, $a_2$, and $a_3$. When Point P is specified inside or on an edge or a face of the triangular pyramid, linear interpolation is performed on the attributes $a_0$, $a_1$, $a_2$, and $a_3$ of the vertices $P_0$, $P_1$, $P_2$, and $P_3$ in accordance with the position of Point P. For the idea of linear interpolation, the above-described linear interpolation in the case of using a triangle may be developed.

Figure 13B:
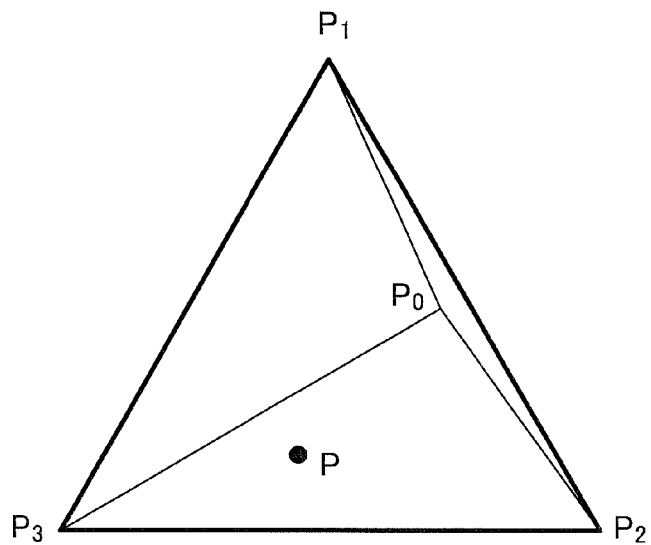

For example, the operator may be allowed to move Point P along a plane including Point P and parallel to the display screen 300 (FIG. 3, etc.) by dragging Point P with a mouse. Further, the operator may also be allowed to change the orientation of the triangular pyramid as illustrated in FIG. 13B by pinching any position of the triangular pyramid with a mouse and rotating the triangular pyramid. The operation may also be allowed to move Point P along a plane including Point P and parallel to the display screen 300 by pinching Point P with the mouse and moving Point P in this state. The area in which Point P is movable differs between FIG. 13A and FIG. 13B. Accordingly, the operator is allowed to move Point P to a desired position by repeatedly rotating the triangular pyramid and moving Point P. The above-described movement of Point P is illustrated as an example, and Point P may also be moved by other techniques.

The present invention is not limited to the above-described embodiment using a triangular pyramid, and it is possible to implement a user interface that disposes sample objects at the vertices of any polyhedron according to an aspect of the present invention.

As the input device 130, an input device having multiple input sensors may be used. Examples of the input device having multiple input sensors include a wheel mouse, a Rubik's Cube®-type input device, and an input device having sensors attached to the joints of a doll. Use of such an input device makes it easy to cause Point P to move in or on a polyhedron. In addition, multiple parameters of an attribute may be assigned to the respective sensors of such an input device so that the values of the parameters may be directly changed.

Further, one or more light sources may be determined as a target object. Application of an embodiment of the present invention to one or more light sources makes it possible to change their positions, directions, luminance, color and so forth. Further, ambient light may also be added as a target object.

In addition, the time-line (time base) of a motion picture may be determined as a target object. Application of an embodiment of the present invention to the time-line of a motion picture makes it possible to specify a temporal position on the time-line. Further, it is possible to compress or expand part of the time-line.

[Process Flow and Apparatus Configuration of Embodiment]

FIG. 14 is a flowchart illustrating a flow of an object correcting method according to an embodiment of the present invention.

First, in step S1401, multiple sample objects are disposed and displayed on a user interface screen. In step S1403, information on the position of a point pointed by an operator using a pointing device such as a mouse is obtained. Then, in step S1405, interpolation is performed on the attributes of the sample objects based on the positions of the sample objects (the positions of the vertices of, for example, a triangle) and the position of the point, and the attribute of a target object is changed based on the obtained interpolated attribute. Then, in step S1407, the target object is corrected based on the changed attribute.

Figure 15:
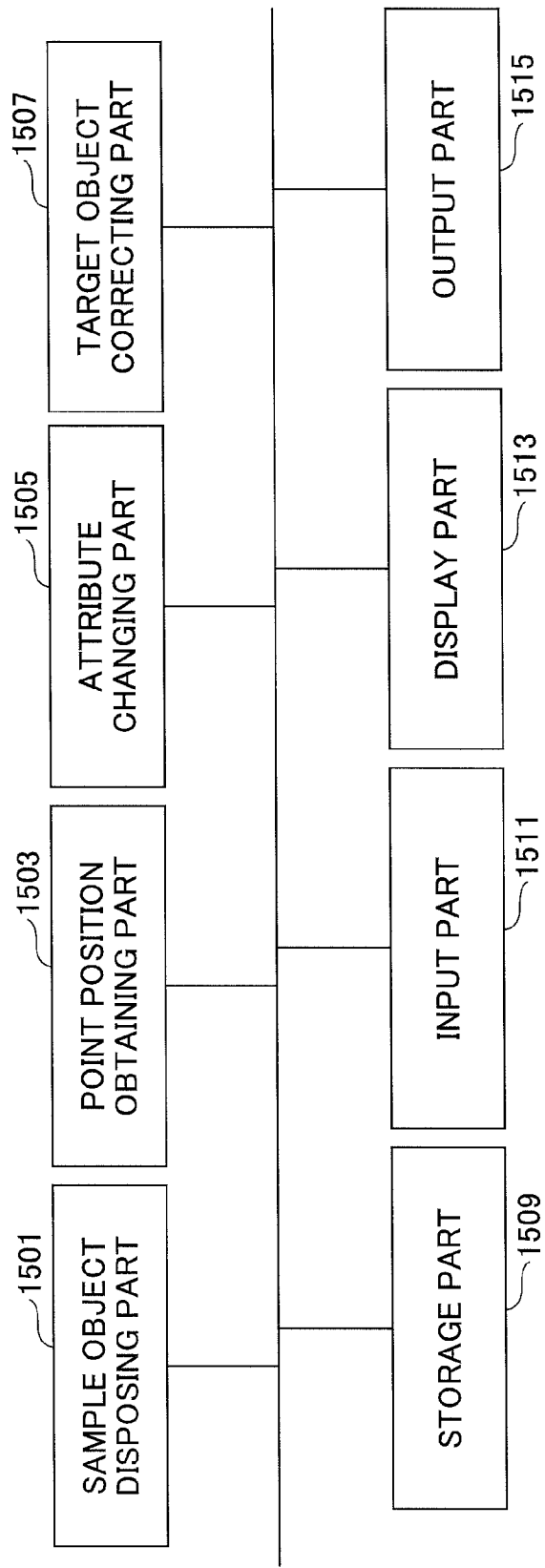
FIG. 15 is a block diagram illustrating a functional configuration of the apparatus according to the embodiment of the present invention.

FIG. 15 is a block diagram illustrating a functional configuration of the apparatus 100 according to the embodiment of the present invention. The apparatus 100 may include a sample object disposing part 1501, a point position obtaining part 1503, an attribute changing part 1505, a target object correcting part 1507, a storage part 1509, an input part 1511, a display part 1513, and an output part 1515. The sample object disposing part 1501 dispose and display multiple sample objects on a user interface screen. The point position obtaining part 1503 obtains information on the position of a point pointed with a pointing device such as a mouse used by an operator. The attribute changing part 1505 performs interpolation on the attributes of the sample objects based on the positions of the sample objects (the positions of the vertices of, for example, a triangle) and the position of the point, and changes the attribute of a target object based on the obtained interpolated attribute. The target object correcting part 1507 corrects the target object based on the changed attribute. The storage part 1509, the input part 1511, the display part 1513, and the output part 1515 may correspond to the memory unit 120, the input device 130, the display unit 140, and the printer 160, respectively, as illustrated in FIG. 1. The apparatus 100 does not have to include the entire configuration illustrated in FIG. 15, while the apparatus 100 may include another configuration.

According to this embodiment, the above-described method may be executed with its steps being interchanged in order as long as no inconsistency is caused. The method with the steps interchanged in order is also within the technical scope of the embodiment.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. An object correcting method, comprising:
    disposing a plurality of sample objects for a skeleton model at different positions on a display screen, wherein each of the skeleton model and the sample objects has an attribute characteristic thereof, the attribute including an amount of rotation of a bone and a position of the bone as parameters;
    obtaining a position of a point on the display screen specified by a user;
    changing the attribute of the skeleton model by performing interpolation that calculates an interpolated value of the amounts of rotation of the bone of the sample objects based on the positions at which the sample objects are disposed and the position of the point and replaces a value of the amount of rotation of the bone of the skeleton model with the calculated interpolated value; and
    correcting the skeleton model based on the changed attribute thereof,
    wherein the skeleton model includes a plurality of parts each formed of a plurality of bones, and the attribute of the skeleton model is changeable with respect to each of the bones of each of the parts, and
    wherein, in said changing the attribute of the skeleton model, when the value of the amount of rotation of the bone is fixed with respect to each of the bones of at least one of the parts, in response to said at least one of the parts being selected by the user, a value of the position of the bone is fixed with respect to each of the bones of said at least one of the parts.

2. The object correcting method as claimed in claim 1, wherein the value of the amount of rotation of the bone of the skeleton model is replaced with the calculated interpolated value in response to receiving an instruction from the user.

3. The object correcting method as claimed in claim 1, wherein at least one of the sample objects has one of a plurality of predetermined attributes determined as the characteristic attribute thereof in response to receiving an instruction from the user.

4. The object correcting method as claimed in claim 1, wherein said disposing disposes the sample objects at positions of vertices of a convex polygon, and the point is positioned in or on the convex polygon.

5. The object correcting method as claimed in claim 1, wherein said disposing disposes the sample objects at positions of vertices of a convex polyhedron, and
    the point is positioned in or on the convex polyhedron.

6. The object correcting method as claimed in claim 1, wherein the amount of rotation of the bone represents one of an angle formed by the bone and another bone and an amount of torsion of the bone.

7. A non-transitory computer-readable recording medium with an executable program recorded thereon, the program causing a computer processor to execute the object correcting method as set forth in claim 1.

8. The object correcting method as claimed in claim 1, wherein
    an area for selecting one or more of the parts with respect to which the amount of rotation of the bone is fixed is displayed independently of the skeleton model on the display screen,
    the amount of rotation of the bone is fixed with respect to each of the bones of said at least one of the parts in response to said at least one of the parts being selected in the area by the user, and
    a mark indicating that the amount of rotation of the bone is fixed with respect to the selected at least one of the parts is displayed in the area in response to said at least one of the parts being selected in the area by the user.

9. The object correcting method as claimed in claim 1, further comprising:
    displaying a plurality of poses with respect to at least one of the sample objects on the display screen, and determining one of the plurality of poses as said at least one of the sample objects in response to said one of the plurality of poses being selected on the display screen by the user.

10. An object correcting apparatus, comprising:
   a processor; and
   a memory storing a program that, when executed by the processor, implements
      a sample object disposing part configured to dispose a plurality of sample objects for a skeleton model at different positions on a display screen, wherein each of the skeleton model and the sample objects has an attribute characteristic thereof, the attribute including an amount of rotation of a bone and a position of the bone as parameters;
      a point position obtaining part configured to obtain a position of a point on the display screen specified by a user;
      an attribute changing part configured to change the attribute of the skeleton model by performing interpolation that calculates an interpolated value of the amounts of rotation of the bone based on the positions at which the sample objects are disposed and the position of the point and replaces a value of the amount of rotation of the bone of the skeleton model with the calculated interpolated value; and
      a target object correcting part configured to correct the skeleton model based on the changed attribute thereof,
   wherein the skeleton model includes a plurality of parts each formed of a plurality of bones, and the attribute of the skeleton model is changeable with respect to each of the bones of each of the parts, and
   wherein, in changing the attribute of the skeleton model by the attribute changing part, when the amount of rotation of the bone is fixed with respect to each of the bones of at least one of the parts, in response to said at least one of the parts being selected by the user, a value of the position of the bone is fixed with respect to each of the bones of said at least one of the parts.

11. The object correcting apparatus as claimed in claim 10, wherein the value of the amount of rotation of the bone of the skeleton model is replaced with the calculated interpolated value in response to receiving an instruction from the user.

12. The object correcting apparatus as claimed in claim 10, wherein at least one of the sample objects has one of a plurality of predetermined attributes determined as the characteristic attribute thereof in response to receiving an instruction from the user.

13. The object correcting apparatus as claimed in claim 10, wherein the skeleton model is an object in a real space or a virtual space, and
   the sample objects are objects in the virtual space.

14. The object correcting apparatus as claimed in claim 10, wherein
   an area for selecting one or more of the parts with respect to which the amount of rotation of the bone is fixed is displayed independently of the skeleton model on the display screen,
   the attribute changing part is configured to fix the amount of rotation of the bone with respect to each of the bones of said at least one of the parts in response to said at least one of the parts being selected in the area by the user, and
   a mark indicating that the amount of rotation of the bone is fixed with respect to the selected at least one of the parts is displayed in the area in response to said at least one of the parts being selected in the area by the user.

15. The object correcting apparatus as claimed in claim 10, wherein
   a plurality of poses are displayed with respect to at least one of the sample objects on the display screen, and
   one of the plurality of poses is determined as said at least one of the sample objects in response to said one of the plurality of poses being selected on the display screen by the user.

* * * * *